No. 687,596. Patented Nov. 26, 1901.
C. E. BLUE.
MACHINE FOR THE MANUFACTURE OF GLASSWARE.
(Application filed Aug. 4, 1900.)
(No Model.) 2 Sheets—Sheet 2.
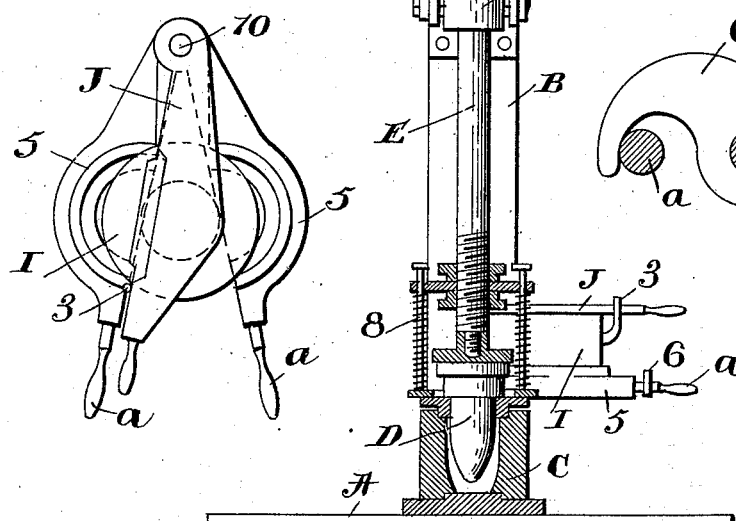
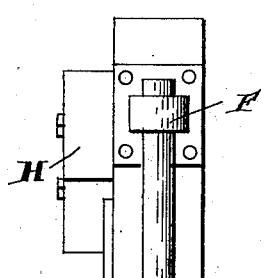

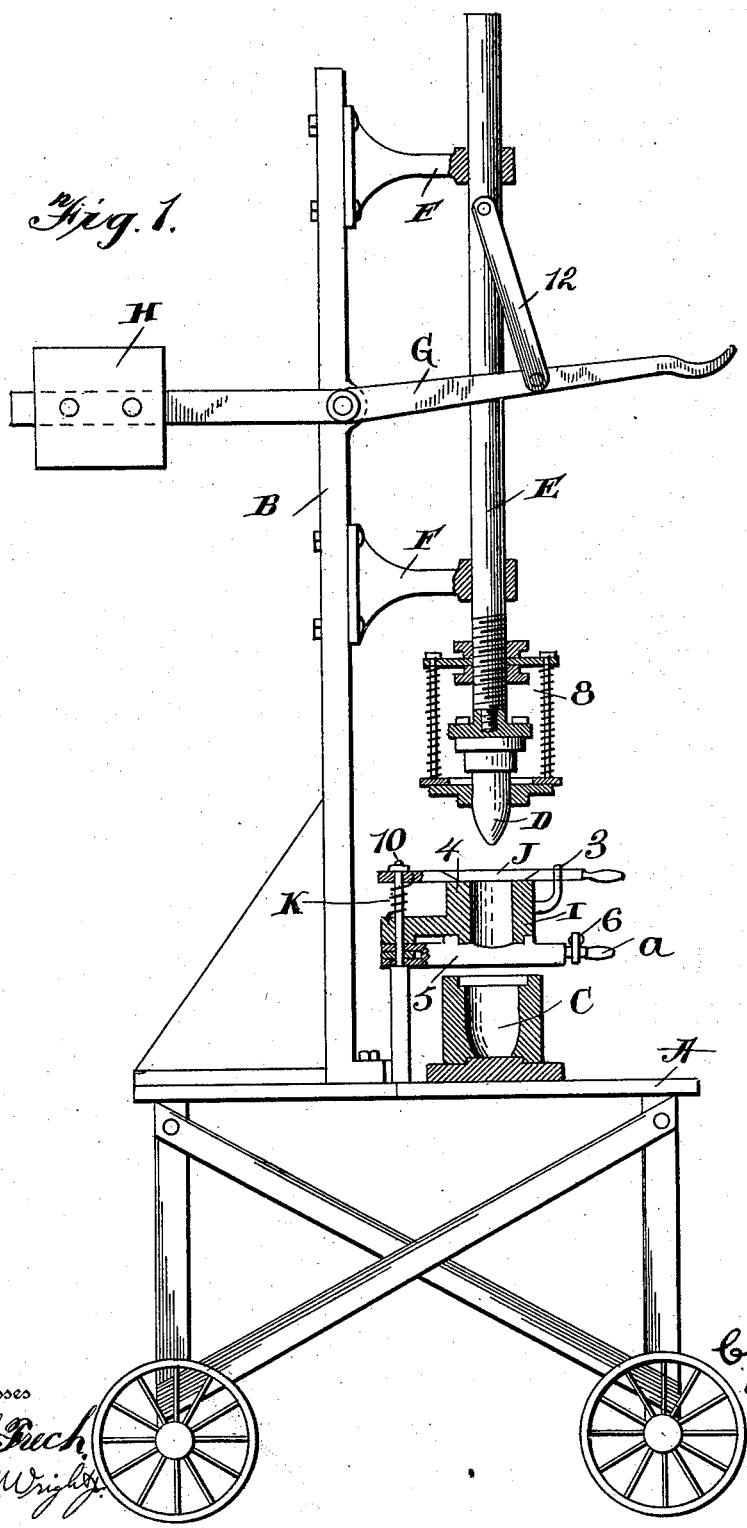

UNITED STATES PATENT OFFICE.

CHARLES EDWIN BLUE, OF WHEELING, WEST VIRGINIA.

MACHINE FOR THE MANUFACTURE OF GLASSWARE.

SPECIFICATION forming part of Letters Patent No. 687,596, dated November 26, 1901.

Application filed August 4, 1900. Serial No. 25,897. (No model.)

*To all whom it may concern:*

Be it known that I, CHARLES EDWIN BLUE, a citizen of the United States, residing at Wheeling, in the county of Ohio and State of West Virginia, have invented new and useful Improvements in Machines for the Manufacture of Glassware, of which the following is a specification.

My invention relates to improvements in machines for the manufacture of glassware, and pertains to providing means for delivering a given quantity of molten glass to the mold at each charge thereof.

In the accompanying drawings, Figure 1 is a side elevation, partly in section, of a machine provided with my invention, the parts being shown in the charging position. Fig. 2 is an end elevation, partly in section, the parts being shown in the pressing position. Fig. 3 is a top view of the measuring-receptacle. Fig. 4 is an enlarged detail view of the latch for locking the two parts of the bottom of the measuring-receptacle in their closed position.

Referring now to the drawings, A is a suitable supporting frame or table, from which projects a standard B. Supported upon the table A is a mold C of any desired form, and supported by the standard B above the mold is a vertically-movable plunger D, adapted to coact with the mold C for forming the article or a blank to be afterward finished. The plunger-rod E passes through laterally-projecting arms F of the standard B and is moved up and down for the purpose of carrying it within and withdrawing it from the mold C. An operating-lever G, provided with a counterweight H, has a link 12 intermediately connected therewith and the opposite end of the link connected with the plunger-rod E, by means of which the presser actuates the plunger for pressing the article or blank, as the case may be. The plunger-rod carries the usual or any other desired form of presser-head 8 for coacting with the mouth or open end of the mold C.

Thus far I have described an ordinary construction, and any form of mold and presser-head and means for actuating it may be applied in connection with my invention for delivering a predetermined and given quantity of molten glass to the mold at each charge thereof. The form here shown for delivering the predetermined quantity of molten glass to the mold consists of a measuring receptacle or vessel I, which is so supported as to be movable in relation to the mold C, whereby after the predetermined quantity of glass has been measured and deposited within the mold the plunger may then be caused to enter the said mold for pressing the delivered glass. However, it will be readily understood by those skilled in the art that instead of having the measuring device movable the mold itself may be moved from under the measure after the measured quantity of molten glass has been delivered thereto.

I here show a knife J, having its inner end pivoted to the upper end of a rod or pin 10, and a suitable spring K, surrounding the upper end of the said pin and one end in engagement with the knife for holding it normally across the open end of the measure, the said knife being stopped in its movement through the medium of a suitable pin or projection 3.

The measure is so constructed that its contents can be readily emptied into the mold below, and this may be accomplished in many ways. One form for accomplishing this result is here illustrated, and consists in providing a movable bottom 5, which, as shown in Fig. 3, is made in two parts, so that they may be readily separated, and each part is provided with a projecting handle *a* and a locking-latch 6, adapted to lock the two parts of the bottom in their closed position.

In the operation of the invention the molten glass is gathered in any suitable manner and delivered to the measure until the measure is full, the knife being held back from over the open end of the measure and when released by the presser will cut the glass, leaving a measured quantity of molten glass within the measure. The bottom of the measure is then opened and the glass permitted to fall into the mold below. The mold and the measure are then relatively moved in respect to each other to permit the plunger or other coacting member to coact with the said mold.

By means of the invention herein shown and described or its mechanical equivalent I am enabled to do away with skilled pressers and gatherers in that unskilled labor may be employed in gathering the glass and delivering it to the measure and unskilled labor employed for delivering the measured glass to the mold and causing the coacting member or plunger to coact with the mold. From this it will be readily understood that I am not only able to produce articles that are uniform in size and thickness and to cause a saving in the glass, but am also enabled to considerably reduce the cost of production on account of using cheaper labor, as the only requisite in the operation of the invention is that there shall be sufficient glass to fill the measure, for if there is too much the knife will remove the surplus, and only a given predetermined quantity of the molten metal will be delivered to the mold.

While I have described and shown a knife for cutting the glass, I wish it to be understood that other forms of cutting members or apparatus may be used without departing from the scope of my invention.

Having thus described my invention, what I claim, and desire to secure by Letters Patent, is—

A machine for the manufacture of glassware comprising a mold, a measure located thereabove, one of said members being relatively movable, the measure having a glass-cutting member at its upper open end, and a movable bottom at its lower end.

In testimony whereof I have hereunto set my hand in the presence of two subscribing witnesses.

CHARLES EDWIN BLUE.

Witnesses:
M. V. BLUE,
W. V. HOGE, Jr.